3,474,067
SELF-EXTINGUISHING POLYOLEFIN COMPOSITIONS
Hans Eberhard Praetzel, Bensberg-Frankenforst, and Herbert Jenkner, Cologne-Deutz, Germany, assignors to Chemische Fabrik Kalk G.m.b.H., Cologne-Kalk, Germany
No Drawing. Filed Feb. 10, 1966, Ser. No. 526,365
Claims priority, application Germany, Feb. 18, 1965, C 35,123; Oct. 15, 1965, C 37,172
Int. Cl. C08f *29/12, 45/56;* C09k *3/28*
U.S. Cl. 260—41　　　　　　　　　　　　　　　10 Claims

ABSTRACT OF THE DISCLOSURE

Self-extinguishing polyolefin based compositions containing 1 to 20 wt. percent of at least one nuclear halogenated polystyrene selected from the group consisting of poly-(monobromostyrene), poly-(dibromostyrene), poly-(tribromostyrene), poly - (tetrabromostyrene), poly-(monochlorodibromostyrene), poly - (dichloromonobromostyrene) and poly-(monochloromonobromostyrene) and from 1 to 10 wt. percent of antimony compound and if desired also containing another organic chlorine compound providing ½ to 5 wt. percent of chlorine in such compositions.

---

This invention concerns polyolefin-based self-extinguishing moulding materials.

By reason of their favourable physical properties, polyolefin-based moulding materials may be used for the most widely diverse industrial applications, particularly as insulating material in the electrical industry. However, the ready combustibility of such moulding materials considerably restricts their possible applications. The combustibility of polyolefin-based moulding materials can be reduced by the addition of flameproofing components such as chloroparaffins, chloronaphthalene or hexachlorocyclopentadiene and synergistic substances such as antimony trioxide. Since, however, considerable quantities of chlorine compounds and antimony trioxides have to be added for this purpose, the mechanical and physical properties, particularly the tensile strength, of polyolefin-based moulding materials are considerably lessened.

It is known that polyolefin-based moulding materials can also be rendered less inflammable by the addition of organic bromine compounds such as for example tribromo-aniline, pentabromodiphenyl ether and other low-molecular aromatic bromine compounds. It has however proved that smaller quantities of organic bromine compounds than of chlorine compounds have to be added to the moulding materials in order to achieve the same flameproofing effect. Therefore, the disadvantageous influence on the mechanical and physical properties of the moulding materials is correspondingly less if organic bromine compounds are added. By virtue of their lower molecular weight, these organic bromine compounds migrate out of the moulding materials again unless the flameproofing component is absolutely compatible with the polyolefin. In many cases, the migration results in an adhesive film forming on the surface of the polyolefins. It is true that the surface of the polyolefin can be cleaned again by being wiped, but this film continues to form afresh because the flameproofing component is being constantly supplied from within. This process means that the interior of the moulding material slowly grows poor in the flameproofing component. With increased reduction in the content of flameproofing component, however, the combustibility of the moulding material increases once again.

Polyolefin-based moulding materials were therefore sought which were self-extinguishing and which did not exhibit the disadvantages of the known self-extinguishing polyolefin-based moulding materials.

Self-extinguishing polyolefin-based moulding materials were found which contained organic bromine compounds and possibly organic chlorine compounds as flameproofing components and antimony compounds such as antimony trioxide and antimony oxychloride as synergistic substances. It is characteristic of these moulding materials that they contain, as organic bromide compound, 1 to 20% by weight and preferably 3 to 15% by weight of nuclear halogenated polystyrenes from the group consisting of poly-(monobromostyrene), poly - (dibromostyrene), poly-(tribromostyrene), poly-(tetrabromostyrene), poly-(monochlorodibromostyrene), poly - (dichloromonobromostyrene), poly-(monochloromonobromostyrene) and mixtures thereof, and 1 to 10% by weight and preferably 3½ to 5% by weight antimony compounds.

As polyolefins, the moulding materials according to the invention may contain high or low-pressure polyethylene, polypropylene, polybutylene, polyisobutylene or polybutadiene or copolymers thereof.

The nuclear-halogenated polystyrene present in the moulding materials according to the invention is obtained by the polymerisation of appropriate nuclear-halogenated styrenes as finely distributed solids. The nuclear-halogenated polystyrenes are added to the polyolefin-based moulding materials in such quantities that these latter preferably contain about 4 to 6% by weight aromatically-bonded bromine and 0 to 20% by weight aromatically-bonded chlorine. In addition to the nuclear-halogenated polystyrenes and the antimony compounds such as for example antimony trioxide and antimony oxychloride, which are known as synergistic compounds, the polyolefin-based moulding materials can also contain ½ to 5% by weight chlorine in the form of organic aliphatically bonded chlorine compounds. Suitable chlorine compounds of this kind are for example chloroparaffins with a chlorine content of 45 to 72% by weight, dimerised hexachlorocyclopentadiene, polyvinyl chloride, post-chlorinated polyvinyl chloride and chlorinated polybutadiene.

Since the halogen is split off from the aliphatically-bonded chlorine compounds at a lower temperature than from nuclear halogenate polystyrenes, an additional flameproofing is achieved in this way for low-temperature and smouldering fires. In these cases, the content of nuclear-halogenated polystyrenes in the moulding materials can be restricted to 1 to 8% by weight.

The nuclear-halogenated polystyrene is admixed with the polyolefin-based moulding material in powdered form, together with the antimony compound and, if applicable, the organic chlorine compounds, before or during plasticisation, and worked in per se known manner, for example by means of an extruder or a mixing mill.

The nuclear-halogenated polystyrenes and the antimony compounds present in the moulding materials composed according to the invention are similar to a filler. As a high-molecular compound, the nuclear-halogenated polystyrene has a reduced tendency to migrate.

Some examples of moulded articles composed according to the invention are given hereinafter. These examples do not imply any limitation of the method and products according to the invention.

In the case of polypropylene and high or medium-pressure polyethylene, the granulate involved is plasticised at temperatures of 190 or 130 or 160° C. respectively and the mixture of flameproofing components worked in under the conditions set out in the following tables, under roller skin friction. Homogeneous distribution of the flameproofing components is achieved in that the roller skin is removed from the roller and turned several times. The finished roller skin is reduced to granular form from which the desired moulding is produced in the plasticised state.

Low-pressure polyethylene powder is blended with the flameproofing components in a conventional mixer. The mixture obtained is extruded at a temperature of 190° C. to form the desired moulded articles.

The behaviour of the samples produced under conditions of fire is tested according to ASTM Specification No. 635.

According to this specification, test bars measuring 13 x 6.5 x 127 mm. are cut from the moulded articles to be tested. These test bars are clamped horizontally at one end in a clamping stand in such a way that the narrow side of the largest of the lateral faces forms an angle of 45° to the horizontal. Under the sample and about 9.6 mm. from it, there is a large Bunsen burner wire gauze about 10.3 sq. cm. in size with 58 meshes/sq. cm. and 116 mm. in length, likewise held by a clamp. For the fire test, a non-luminous Bunsen burner flame is applied to the free end of the test bar for 30 seconds and the time required for the sample to extinguish itself after removal of the flame is measured.

We claim:

1. A self-extinguishing moulding composition comprising
   (a) a polyolefin,
   (b) from 1 to 15% by weight of a nuclear-halogenated polystyrene selected from the group consisting of poly-(monobromostyrene), poly-(dibromostyrene), poly-(tribromostyrene), poly-(tetrabromostyrene), poly-(monochlorodibromostyrene), poly-(dichloromonobromostyrene) and poly-(monochloromonobromostyrene) and mixtures thereof, and
   (c) from 1 to 10% by weight of an antimony compound selected from the group consiting of antimony trioxide and antimony oxychloride.

2. A composition according to claim 1 which comprises 3.5 to 5% of antimony trioxide.

3. A composition according to claim 2 in which the nuclear-halogenated polystyrene is nuclearly brominated poly-(tribromostyrene).

4. A self-extinguishing moulding composition consisting essentially of
   (a) a polyolefin,
   (b) from 1 to 8% by weight of a nuclear-halogenated polystyrene selected from the group consisting of poly-(monobromostyrene), poly-(dibromostyrene), poly-(tribromostyrene), poly-(tetrabromostyrene), poly-(monochlorodibromostyrene), poly-(dichloromonobromostyrene) and poly-(monochloromonobromostyrene) and mixtures thereof,
   (c) from 0.5 to 5% by weight chlorine in the form of an organic aliphatically-bonded chlorine compound selected from the group consisting of solid chloroparaffins with a chlorine content of 45 to 72% by weight, dimerised hexachlorocyclopentadiene and polyvinyl chloride, and
   (d) from 3.5 to 5% by weight of an antimony compound selected from the group consisting of antimony trioxide and antimony oxychloride.

5. A composition according to claim 4 wherein the polyolefin is polyethylene.

6. A composition according to claim 4 wherein the polyolefin is polypropylene.

7. A composition according to claim 4 wherein said nuclear-halogenated polystyrene is poly-(tribromostyrene).

8. A composition according to claim 4 wherein said aliphatically-bonded chlorine compound is a solid chloroparaffin.

9. A composition according to claim 4 wherein said

TABLE 1

| Number | Parts by weight | Polyolefin | Poly-(tribromostyrene), parts by weight | $Sb_2O_3$, parts by weight | Aliphatically-bonded chlorine compound, parts by weight | Extinguishing time |
|---|---|---|---|---|---|---|
| 1 | 150 | High-pressure polyethylene (Density 0.918) | 9.7 | 5.8 | 2.7 solid chloroparaffin (70% Cl) | Less than 1 sec. |
| 2 | 150 | Medium-pressure polyethylene (Density 0.925) | 9.7 | 5.8 | 2.7 dimerised hexachlorocyclopentadiene | Do. |
| 3 | 150 | Low-pressure polyethylene (Density 0.948) | 9.7 | 5.8 | do | Do. |
| 4 | 150 | Polypropylene | 9.7 | 5.8 | do | Do. |
| 5 | 150 | Low-pressure polyethylene (Density 0.948) | 9.7 | 5.8 | 2.7 post-chlorinated PVC (70% Cl) and 0.3 stabiliser | Do. |
| 6 | 150 | do | 9.7 | 5.8 | 2.7 solid chloroparaffin (70% Cl) | Do. |
| 7 | 150 | Medium-pressure polyethylene (Density 0.925) | 9.7 | 5.8 | do | Do. |

TABLE 2

| Number | Polyolefin, parts by weight | Nuclear-halogenated polystyrene, parts by weight | $Sb_2O_3$, parts by weight | Aliphatically-bonded chlorine compound, parts by weight | Extinguishing time per ASTM 635 |
|---|---|---|---|---|---|
| 1 | 100 low-pressure polyethylene (Density 0.948) | 5.7 poly-(tetrabromostyrene) | 3.85 | 1.8 solid chloroparaffin (70% by weight Cl) | Less than 1 sec. |
| 2 | 100 medium-pressure polyethylene (Density 0.925) | 7.1 poly-(dibromostyrene) | 3.85 | 1.8 dimerised hexachlorocyclopentadiene | Do. |
| 3 | 100 high-pressure polyethylene (Density 0.918) | 10.0 poly-(monobromostyrene) | 3.85 | 1.8 solid chloroparaffin (70% by weight Cl) | Do. |
| 4 | 100 polypropylene | 11.0 poly-(monochlorodibromostyrene) | 3.85 | do | Do. |
| 5 | do | 14.2 poly-(dichloromonobromostyrene) | 3.85 | 1.8 dimerised hexachlorocyclopentadiene | Do. | aliphatically-bonded chlorine compound is dimerised hexachlorocyclopentadiene.

10. A composition according to claim 4 wherein the antimony compound is antimony trioxide.

References Cited

UNITED STATES PATENTS 2,480,298   8/1949   Happoldt ---------- 260—28.5
3,063,954  11/1962   Galizia ------------ 260—2.5
3,121,067   2/1964   Nelson ------------- 260—41

OTHER REFERENCES

Miles et al., Polymer Technology, Temple Press Books, London, 1965, pages 342–344.

Marvel et al., Polystyrene and Some of its Derivatives, in American Chemical Society Journal, vol. 62, 1940, pages 45–49.

MORRIS LIEBMAN, Primary Examiner

J. H. DERRINGTON, Assistant Examiner

U.S. Cl. X.R.

260—45.75, 897